United States Patent
Ohashi et al.

(10) Patent No.: US 10,749,402 B2
(45) Date of Patent: Aug. 18, 2020

(54) ROTARY ELECTRIC MACHINE

(75) Inventors: Naoki Ohashi, Chiyoda-ku (JP); Masaya Inoue, Chiyoda-ku (JP); Koichi Ojima, Chiyoda-ku (JP); Kazuyuki Iwamoto, Minato-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 1398 days.

(21) Appl. No.: 14/383,212

(22) PCT Filed: May 2, 2012

(86) PCT No.: PCT/JP2012/061599
§ 371 (c)(1),
(2), (4) Date: Sep. 5, 2014

(87) PCT Pub. No.: WO2013/164889
PCT Pub. Date: Nov. 7, 2013

(65) Prior Publication Data
US 2015/0076940 A1    Mar. 19, 2015

(51) Int. Cl.
*H02K 5/04* (2006.01)
*H02K 5/20* (2006.01)
(Continued)

(52) U.S. Cl.
CPC ............ *H02K 5/04* (2013.01); *H02K 1/185* (2013.01); *H02K 5/02* (2013.01); *H02K 5/06* (2013.01);
(Continued)

(58) Field of Classification Search
CPC ............ H02K 1/185; H02K 5/04; H02K 1/18; H02K 15/14
(Continued)

(56) References Cited

U.S. PATENT DOCUMENTS 4,652,782 A * 3/1987 Rossie ................ H02K 1/185
29/596
5,220,233 A * 6/1993 Birch ................ H02K 1/2733
310/156.28
(Continued)

FOREIGN PATENT DOCUMENTS

JP    50-92302 U    8/1975
JP    58-136942 U    9/1983
(Continued)

OTHER PUBLICATIONS

English machine translation of Inayama et al., JP 2009-060760, Mar. 2009.*
(Continued)

*Primary Examiner* — Burton S Mullins
(74) *Attorney, Agent, or Firm* — Sughrue Mion, PLLC; Richard C. Turner

(57) ABSTRACT

The rotary electric machine includes: a stator that includes: a stator core; and a stator coil; a ring member that accommodates the stator so as to hold the stator core in an internally fitted state; a housing case formed into a floored cylindrical shape with an opening at a first end portion, and that accommodates the ring member and the stator; and a cover mounted onto the first end portion of the housing case so as to cover the opening of the housing case, wherein a first end portion of each of the ring member and the housing case is fixed by fastening to the cover such that a fastening direction of each is oriented in an axial direction, and a second end portion of the ring member is fitted into and held by the housing case by means of an interfitting member.

4 Claims, 5 Drawing Sheets

(51) Int. Cl.
  *H02K 9/14* (2006.01)
  *H02K 1/18* (2006.01)
  *H02K 5/06* (2006.01)
  *H02K 5/02* (2006.01)
  *H02K 9/00* (2006.01)

(52) U.S. Cl.
  CPC ............. *H02K 5/20* (2013.01); *H02K 9/00* (2013.01); *H02K 1/18* (2013.01)

(58) Field of Classification Search
  USPC ............. 310/89, 91, 216.113–216.114, 310/216.118–216.119
  See application file for complete search history.

(56) References Cited

U.S. PATENT DOCUMENTS

| | | | | |
|---|---|---|---|---|
| 6,943,479 | B2* | 9/2005 | Laurent | H02K 1/12 29/596 |
| 7,284,313 | B2* | 10/2007 | Raszkowski | B60K 6/365 180/65.21 |
| 8,164,230 | B2* | 4/2012 | Sugiyama | H02K 1/18 310/216.004 |
| 8,803,381 | B2* | 8/2014 | Lepres | H02K 5/20 310/58 |
| 2004/0124720 | A1* | 7/2004 | Condamin | H02K 5/20 310/51 |
| 2011/0227446 | A1* | 9/2011 | Vedy | H02K 1/16 310/216.118 |
| 2012/0013225 | A1* | 1/2012 | Chamberlin | H02K 11/225 310/68 B |
| 2012/0061201 | A1* | 3/2012 | Isogai | B60K 6/26 192/85.01 |
| 2012/0306312 | A1* | 12/2012 | Endo | H02K 1/185 310/216.113 |

FOREIGN PATENT DOCUMENTS

| | | |
|---|---|---|
| JP | 2009-60760 A | 3/2009 |
| JP | 2009-131083 A | 6/2009 |
| JP | 2009-142031 A | 6/2009 |
| JP | 2010-057260 A | 3/2010 |
| JP | 2010-114951 A | 5/2010 |
| JP | 2010-246259 A | 10/2010 |
| WO | 2011/080817 A1 | 7/2011 |
| WO | 2011/101960 A1 | 8/2011 |
| WO | WO 2011157410 A1 * | 12/2011 ............. F04B 35/04 |

OTHER PUBLICATIONS

English machine translation of Kamiya et al., JP 2010-246259, Oct. 2010.*
English machine translation of Kato, JP 2009-131083, Jun. 2009.*
English machine translation, Guitari WO 2011157410. (Year: 2011).*
Communication dated Jun. 3, 2016 from the State Intellectual Property Office of the P.R.C. in counterpart Application No. 201280072894.4.
International Search Report for PCT/JP2009/071750 dated Jun. 12, 2012.

* cited by examiner

ROTARY ELECTRIC MACHINE

CROSS REFERENCE TO RELATED APPLICATIONS

This application is a National Stage of International Application No. PCT/JP2012/061599 filed May 2, 2012, the contents of all of which are incorporated herein by reference in their entirety.

TECHNICAL FIELD

The present invention relates to a rotary electric machine in which a ring member is accommodated in a floored cylindrical housing case so as to hold a stator core, and in which a disk-shaped cover closes an opening of the housing case, and particularly relates to a fixing construction for the ring member.

BACKGROUND ART

In conventional rotary electric machines, a ring member that holds a stator core is accommodated in a case such that a second end portion is fitted together therewith, and is held on the case by fastening and fixing a flange portion that extends radially at a first end onto a first end surface of the case using a bolt, a cover is fitted onto the case so as to close an opening near a first end of the case, and a rotor is accommodated inside the stator core so as to be rotatably supported by the floor portion of the case and the cover (see Patent Literature 1, for example).

CITATION LIST

Patent Literature

Patent Literature 1: International Publication No. WO/2011/080817 (Pamphlet)

SUMMARY OF THE INVENTION

Problem to be Solved by the Invention

In conventional rotary electric machines, because the ring member is mounted onto the case by fastening and fixing the flange portion that extends radially onto the case that is disposed on an outer circumferential side of the ring member, one problem has been that radial dimensions are increased.

The present invention aims to solve the above problems and an object of the present invention is to provide a compact rotary electric machine in which increases in radial dimensions are suppressed by fastening and fixing a ring member and a first end portion of a housing case onto a cover that closes an opening of the housing case such that a fastening direction is oriented in an axial direction.

Means for Solving the Problem

In order to achieve the above object, according to one aspect of the present invention, there is provided a rotary electric machine including: a stator that includes: a stator core; and a stator coil that is mounted onto the stator core; a ring member that accommodates the stator so as to hold the stator core in an internally fitted state; a housing case that is formed into a floored cylindrical shape that has an opening at a first end portion, and that accommodates the ring member and the stator; a cover that is mounted onto the first end portion of the housing case so as to cover the opening of the housing case; and a rotor that is fixed to a shaft that is rotatably supported by a floor portion of the housing case and by the cover so as to be rotatably disposed on an inner circumferential side of the stator. A first end portion of each of the ring member and the housing is are fixed by fastening to the cover such that a fastening direction of each is oriented in an axial direction, and a second end portion of the ring member is fitted into and held by the housing case by means of an interfitting member.

Effects of the Invention

According to the present invention, a first end portion of each of the ring member and the housing case is fixed by fastening to the cover that closes the opening of the housing case such that a fastening direction of each is oriented in an axial direction. Thus, the fastening positions can be moved radially inward compared to when the ring member is fastened and fixed onto the housing case around an outer circumference thereof, suppressing increases in radial dimensions, and enabling downsizing of the rotary electric machine to be achieved.

DESCRIPTION OF EMBODIMENTS

Preferred embodiments of a rotary electric machine according to the present invention will now be explained with reference to the drawings.

Embodiment 1

Figure 1:
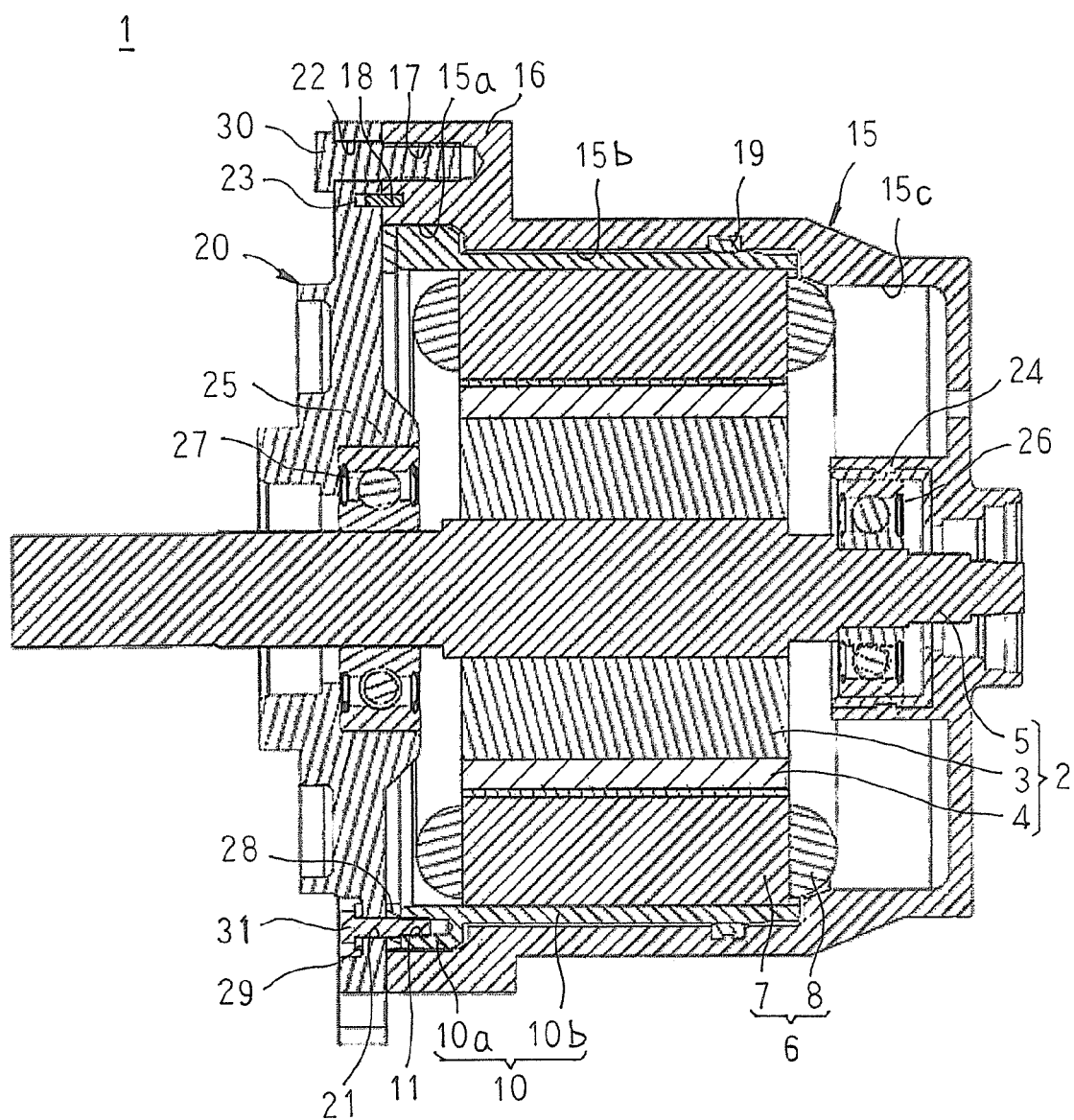
FIG. 1 is a cross section that shows a rotary electric machine according to Embodiment 1 of the present invention.
Figure 2:
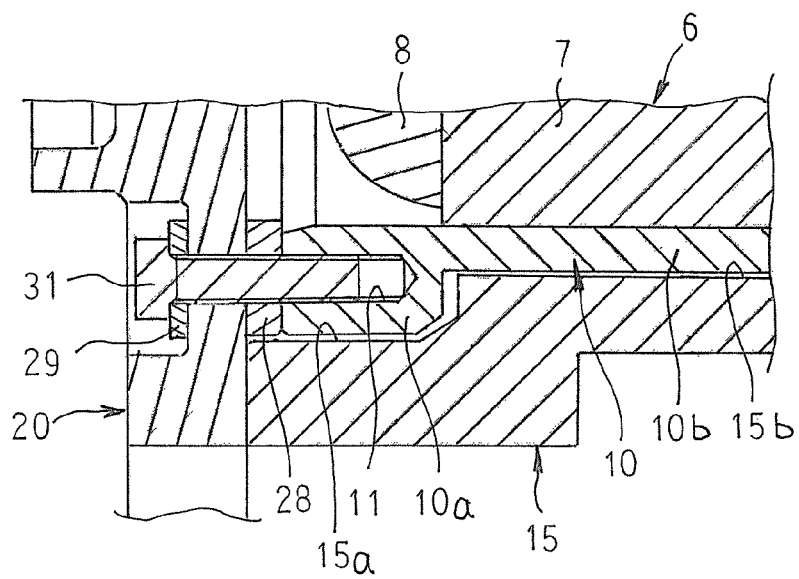
FIG. 2 is a partial cross section that shows a vicinity of a fixing portion of a ring member in the rotary electric machine according to Embodiment 1 of the present invention.

FIG. 1 is a cross section that shows a rotary electric machine according to Embodiment 1 of the present invention, and FIG. 2 is a partial cross section that shows a vicinity of a fixing portion of a ring member in the rotary electric machine according to Embodiment 1 of the present invention.

In FIGS. 1 and 2, a rotary electric machine 1 includes: a rotor 2; a stator 6 that is disposed so as to surround the rotor 2; and a housing case 15 that accommodates the rotor 2 and the stator 6 internally.

The rotor 2 includes: a rotor core 3 that is configured by laminating electromagnetic steel sheets, for example; permanent magnets 4 that are embedded near an outer circumferential surface of the rotor core 3 so as to extend axially so as to be disposed at a uniform angular pitch circumferentially; and a shaft 5 that is inserted through a central position of the rotor core 3, and that is fixed to the rotor core 3. Moreover, the permanent magnets 4 are mounted onto the rotor core 3 such that North-seeking (N) poles and South-seeking (S) poles line up so as to alternate circumferentially.

The stator 6 includes: a stator core 7 that is configured by laminating electromagnetic steel sheets, for example; and a stator coil 8 that is mounted onto the stator core 7. The stator core 7 is produced so as to have an annular shape such that slots that have openings on an inner circumferential side are arranged at a uniform angular pitch circumferentially so as to have groove directions oriented in an axial direction. A method for winding the stator coil 8 may be either distributed winding or concentrated winding. Furthermore, copper wire such as round wire, or rectangular wire that is coated with an insulator is used as the conductor wire that constitutes the stator coil.

A ring member 10 is produced so as to have a cylindrical shape using a ferrous material such as a stainless alloy, for example, and an outer circumference near a first end thereof is expanded outward to form an annular thick portion 10a. A plurality of internal screw thread portions 11 are formed at a uniform angular pitch on a first end surface of the thick portion 10a of the ring member 10 such that threaded aperture directions thereof are oriented axially. An axial length of the ring member 10 on a second end side from the thick portion 10a (hereinafter called "the stator core accommodating portion") is slightly longer than an axial length of the stator core 7. The stator core 7 is held in an internally fitted state by the stator core accommodating portion of the ring member 10.

The housing case 15 is produced so as to have a floored cylindrical shape by die casting using aluminum, or an aluminum alloy, for example, as a material, such that a bearing box 24 is formed at a central axial position on an inner surface of the floor portion. An inner circumferential surface of the housing case 15 is formed into a stepped shape that includes: a first cylindrical surface 15a that has an inside diameter that is slightly larger than an outside diameter of the thick portion 10a of the ring member 10 at a first end (opening end); a second cylindrical surface 15b that has an inside diameter that is slightly larger than an outside diameter of the stator core accommodating portion of the ring member 10; and a third cylindrical surface 15c that has an inside diameter that is slightly smaller than an outside diameter of the second cylindrical surface 15b. A plurality of mounting portions 16 are disposed at a uniform angular pitch circumferentially so as to each protrude radially outward from an open end portion of the housing case 15. An internal screw thread portion 17 is formed on a first end surface of each of the mounting portions 16 such that a threaded aperture direction thereof is oriented axially. A plurality of positioning pins 18 are disposed so as to stand on the first end surface of the housing case 15.

An interfitting member 19 is produced so as to have an annular shape that has an inside diameter that is slightly smaller than an outside diameter of the stator core accommodating portion 10b of the ring member 10 using a similar or identical material to that of the ring member 10, and is cast in the housing case 15 so as to be exposed on the second cylindrical surface 15b near the third cylindrical surface 15c. A cover 20 is produced into a disk shape by die casting using aluminum, for example, as a material, such that a bearing box 25 is formed at a central position. Penetrating apertures 21 and 22 are disposed so as to pass through so as to face the internal screw thread portions 11 and 17. Positioning apertures 23 are formed so as to face the positioning pins 18.

To assemble the rotary electric machine 1 that is configured in this manner, the stator 6 is first mounted into the ring member 10 such that the stator core 7 onto which the stator coil 8 is mounted is held in an internally fitted state in the stator core accommodating portion 10b of the ring member 10 by press-fitting or shrinkage fitting, etc. A bearing 26 is mounted into the bearing box 24. Next, a bearing 27 is mounted into the bearing box 25, and the rotor 2 is mounted onto the cover 20 by press-fitting a portion of the shaft 5 that extends outward from the rotor core 3 at a first axial end portion into the bearing 27.

Next, the ring member 10, onto which the stator 6 is mounted, is inserted into the housing case 15 from a side near the opening. The ring member 10 is thereby held by the housing case 15 by a second end portion thereof being fitted together with the interfitting member 19. The thick portion 10a is accommodated in the first cylindrical portion 15a, and the stator core accommodating portion 10b is accommodated in the second cylindrical portion 15b.

Next, washers 28 are mounted onto portions of the end surfaces of the ring member 10 at the internal screw thread portions 11, and the rotor 2 that is mounted onto the cover 20 is inserted into the housing case 15 from a side near the opening. A second end portion of the shaft 5 is then press-fitted into the bearing 26, and the positioning pins 18 are inserted into the positioning apertures 23. Next, screws 30 that function as fastening members are inserted into the penetrating apertures 22 and fastened into the internal screw thread portions 17 to mount the cover 20 onto the housing case 15. The opening of the housing case 15 is closed thereby. In addition, washers 29 are mounted onto portions of the penetrating apertures 21, and screws 31 that function as fastening members are inserted into the penetrating apertures 21 and fastened into the internal screw thread portions 11 to mount the ring member 10 onto the cover 20, thereby assembling the rotary electric machine 1.

The rotary electric machine 1 that is assembled in this manner is used as a motor of an automotive transmission, or as a generator, in a hybrid automobile or an electric automobile, for example. The rotor 2 is rotatably disposed inside the housing case 15 by the shaft 5 being supported by the bearings 26 and 27. The ring member 10 is supported at two points, i.e., by a first end being fastened and fixed onto the cover 20, and by a second end portion being fitted together with the interfitting member 19. The stator 6 is held by the ring member 10 so as to be disposed so as to surround the rotor core 3.

In Embodiment 1, because the cylindrical ring member 10 is fixed by fastening to the cover 20 that is disposed at the first axial end, the fastening position can be positioned radially further inward than when the ring member 10 is fixed by fastening to the housing case 15 that is disposed on an outer circumferential side thereof. Thus, the outside diameter of the thick portion 10a on which the internal screw thread portions 17 are formed can be reduced, enabling downsizing of the rotary electric machine 1 to be achieved.

Because the ring member 10 is supported at two points, i.e., by the first end being fastened and fixed onto the cover 20, and by the second end portion being fitted together with the interfitting member 19, vibration of the stator 6 that is held by the ring member 10 is suppressed. Thus, vibration and noise in the rotary electric machine 1 that result from vibration of the stator 6 are reduced. Because the interfitting member 19 has an inside diameter that is slightly smaller than the outside diameter of the stator core accommodating portion 10b, the stator core accommodating portion 10b is easily press-fitted into the interfitting member 19, reducing stresses that arise at the interfitting portion between the two.

Because the interfitting member 19 is cast into the housing case 15, the number of parts is reduced, improving assembly of the rotary electric machine 1.

The ring member 10 is produced using a ferrous material, and the housing case 15 is produced using aluminum. Now, if the second end portion of the ring member 10 were fitted together with the second cylindrical portion 15b of the housing case 15 directly, scraping, etc., would arise at the interfitted portion of the housing case 15, making coaxiality of the ring member 10 poor. Here, because the interfitting member 19 that is produced using a material that is similar or identical to that of the ring member 10 is disposed near the second end of the second cylindrical portion 15b, the ring member 10 will not contact the housing case 15. Thus, there is no deterioration in coaxiality of the ring member 10 that would result from scraping, etc., of the housing case 15. In other words, the ring member 10 can be mounted into the housing case 15 with high coaxiality.

A machining process is applied to the housing case 15 after die casting to form the internal screw thread portions 11, the pin insertion apertures for the positioning pins 18, etc. Because the interfitting member 19 is cast in the housing case 15, coaxiality of the interfitting member 19 is improved.

The bearing 26 is held by the bearing box 24 on the housing case 15, and the bearing 27 is held by the bearing box 25 on the cover 20. The housing case 15 and the cover 20 are positioned and assembled by interfitting of the positioning pins 18 and the positioning apertures 23. Thus, coaxiality of the bearings 26 and 27 is improved, stabilizing the axial center of the shaft 5 of the rotor 2 to reduce vibration and noise in the rotary electric machine 1.

Because the ring member 10 and the housing case 15 are fixed by fastening onto the cover 20, the cover 20 can be mounted, and then the cover 20 and the ring member 10 and the cover 20 and the housing case 15 can be fixed by fastening from near a first axial end of the cover 20. Thus, assembly equipment and the assembly process are simplified, enabling cost reductions in equipment and assembly to be achieved.

Next, effects due to interposing washers between the fastening portions will be explained.

Figure 3:
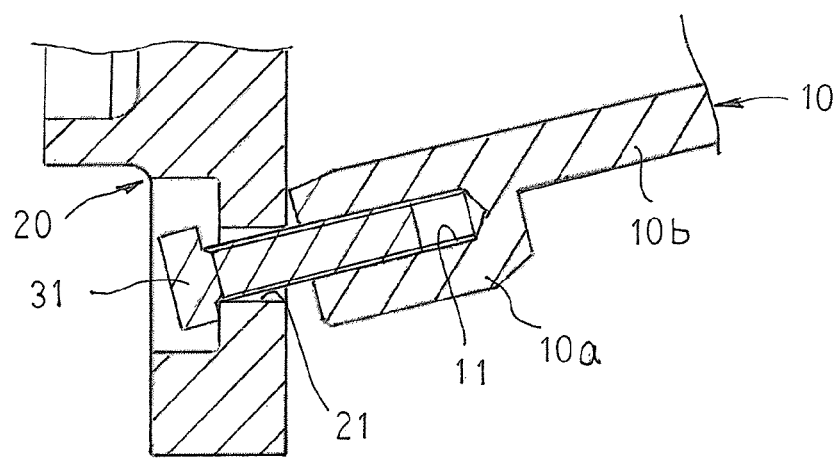
FIG. 3 is a partial cross section that shows a vicinity of a fastening portion between the ring member and a cover.
Figure 4:
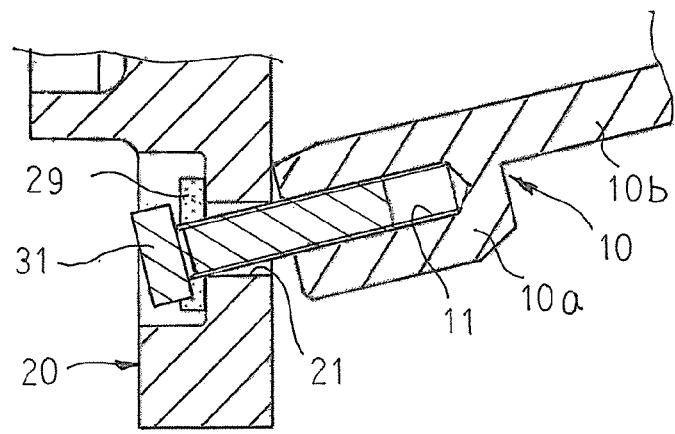
FIG. 4 is a partial cross section that shows a vicinity of the fastening portion between the ring member and the cover.
Figure 5:
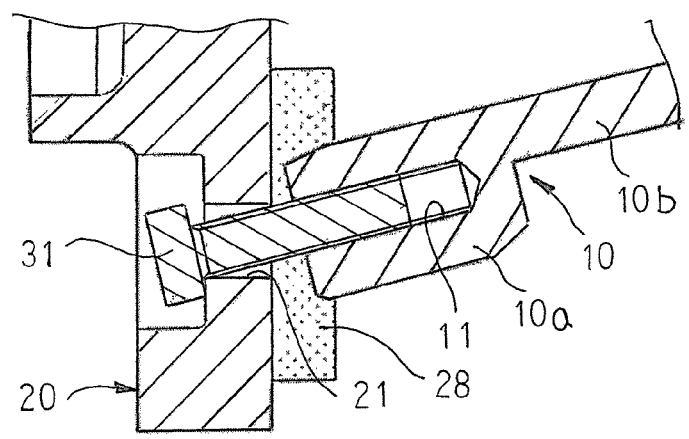
FIG. 5 is a partial cross section that shows a vicinity of the fastening portion between the ring member and the cover.

FIGS. 3 through 5 are partial cross sections that show a vicinity of the fastening portion between the ring member and the cover, FIG. 3 showing a state without a washer mounted, FIG. 4 showing a state in which a washer is mounted between a screw head portion and the cover, and FIG. 5 showing a state in which a washer is mounted between the ring member and the cover. Moreover, in FIGS. 3 through 5, the inclination of the ring member has been exaggerated to facilitate explanation. Here, the washers 28 and 29 are produced using a material that is softer than the ring member 10 and the screws 31, such as copper, for example, and constitute stress relieving members.

Before being fixed by fastening to the cover 20, the ring member 10 is supported as a cantilever by interfitting with the interfitting member 19. Thus, magnetic forces from the permanent magnets 4 of the rotor 2 may act on the ring member 10, making it incline relative to a central axis of the housing case 15. As shown in FIG. 3, if the screws 31 are fastened into the internal screw thread portions 11 in this state, corner portions of head portions of the screws 31 and an inner circumferential edge portion of the opening of the ring member 10 contact the cover 20. Thus, localized stresses act on the cover 20 and the screws 31, generating shearing forces, and there is a risk that the cover 20 and the screws 31 may be damaged.

Now, if the washers 29 are mounted between the head portions of the screws 31 and the cover 30, as shown in FIG. 4, then the portions of the washers 29 that the corner portions of the head portions of the screws 31 contact deform plastically. Thus, the localized stresses that act on the screws 31 are relieved, suppressing the occurrence of damage to the screws 31. The fastening forces from the screws 31 act on the cover 20 through the washers 29, relieving the localized stresses that act on the cover 20, and suppressing the occurrence of damage to the cover 20.

If the washers 28 are mounted between the ring member 10 and the cover 30, as shown in FIG. 5, the portions of the washers 28 that the inner circumferential edge portion of the opening of the ring member 10 contact deform plastically. Thus, the localized stresses that act on the cover 20 are relieved, suppressing the occurrence of damage to the cover 20.

In Embodiment 1, because the washers 28 are interposed between the ring member 10 and the cover 20, and the washers 29 are interposed between the head portions of the screws 31 and the cover 20, the occurrence of damage to the cover 20 and the screws 31 that results from cantilevered supporting of the ring member 10 is suppressed.

Moreover, in Embodiment 1 above, the ring member 10 and the housing case 15 are fixed to the cover 20 by fastening the screws 30 and 31 into the internal screw thread portions 11 and 17 that are formed on the thick portion 10a of the ring member 10 and on the mounting portions 16 of the housing case 15, but anchor bolts may be mounted onto a thick portion and mounting portions, and the ring member and the housing case fastened to the cover by the anchor bolts and nuts. In that case, the anchor bolts and nuts constitute fastening members.

Embodiment 2

Figure 6:
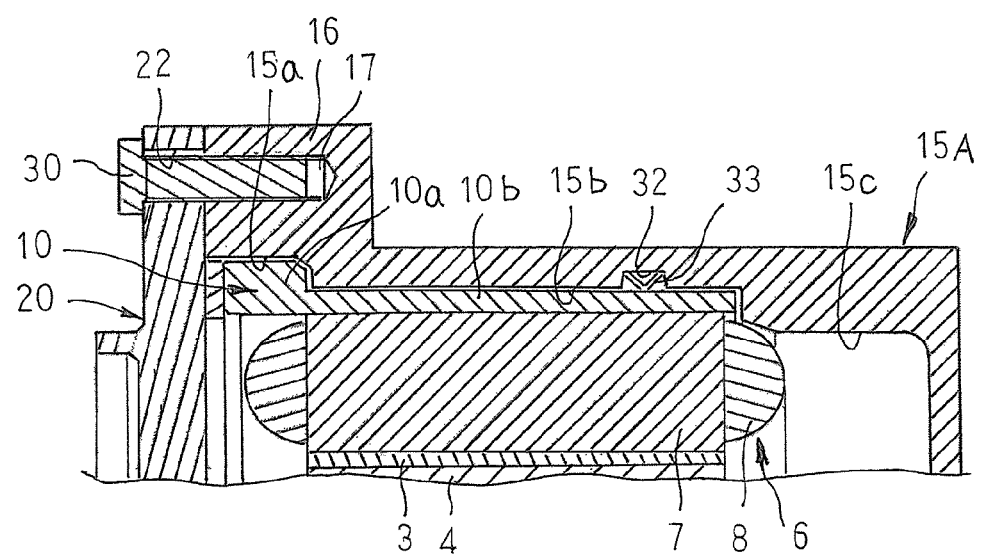
FIG. 6 is a partial cross section that shows an interfitting construction of a ring member in a rotary electric machine according to Embodiment 2 of the present invention.
Figure 7:
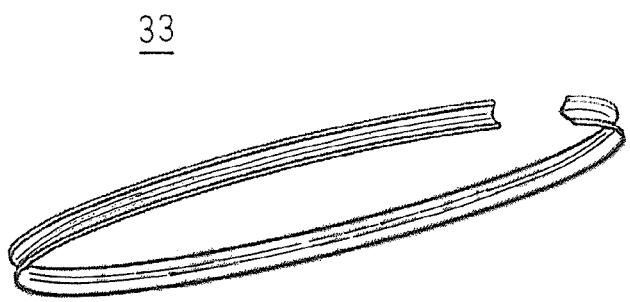
FIG. 7 is a partially cut-away oblique projection that shows an interfitting member in the rotary electric machine according to Embodiment 2 of the present invention.

FIG. 6 is a partial cross section that shows an interfitting construction of a ring member in a rotary electric machine according to Embodiment 2 of the present invention, and FIG. 7 is a partially cut-away oblique projection that shows an interfitting member in the rotary electric machine according to Embodiment 2 of the present invention.

In FIGS. 6 and 7, an interfitting member-accommodating groove 32 has a groove shape that has a box-shaped cross section, and is formed into an annular shape coaxially near a second end of a second cylindrical portion 15b of a housing case 15A. An interfitting member 33 is produced using a spring steel material into an annular body that has a V-shaped cross section, and in which a bottom portion of the V-shaped cross section is oriented radially inward, and is accommodated in the interfitting member-accommodating groove 32 such that the bottom portion of the V-shaped cross section is made to protrude from an inner circumferential surface of the second cylindrical portion 15b. An inside diameter of the interfitting member 33 that is accommodated in the interfitting member-accommodating groove 32 is smaller than an outside diameter of the ring member 10.

Moreover, the rest of the configuration is formed in a similar or identical manner to that of Embodiment 1 above.

In Embodiment 2, the ring member 10 into which the stator 6 has been mounted is inserted from a side near the opening of the housing case 15A, and a second end portion of the ring member 10 is press-fitted into the interfitting member 33. At this point, the bottom portion of the V-shaped cross section is pushed up radially outward, and the interfitting member 33 deforms elastically such that an open side widens. Thus, the second end portion of the ring member 10 is elastically supported in the housing case 15A by means of the interfitting member 33.

According to Embodiment 2, because the second end portion of the ring member 10 is elastically supported, stresses that act on the ring member 10 and the housing case 15A as a result of the interfitting between the ring member 10 and the housing case 15A can be reduced significantly.

Embodiment 3

Figure 8:
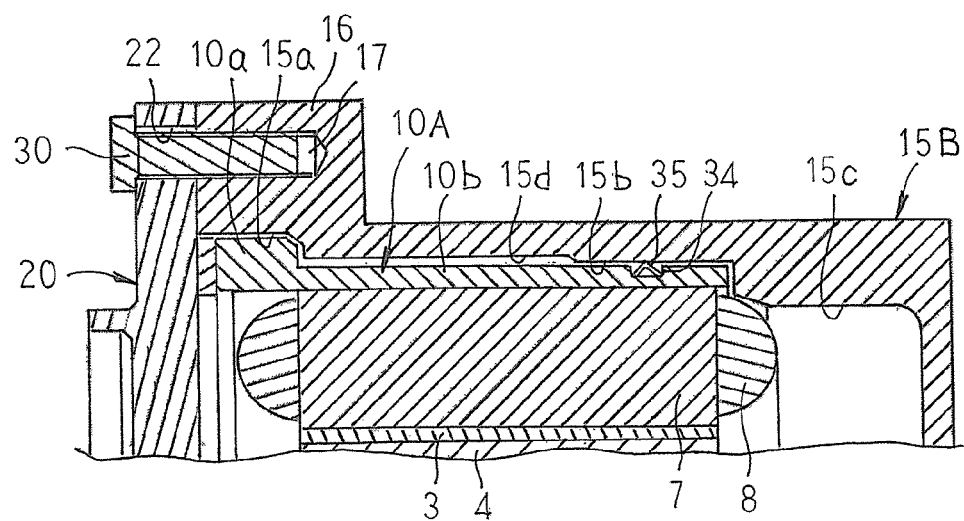
FIG. 8 is a partial cross section that shows an interfitting construction of a ring member in a rotary electric machine according to Embodiment 3 of the present invention.

FIG. 8 is a partial cross section that shows an interfitting construction of a ring member in a rotary electric machine according to Embodiment 3 of the present invention.

In FIG. 8, in a housing case 15B, a fourth cylindrical portion 15d that has a smaller diameter than an inside diameter of a first cylindrical portion 15a and that has a larger diameter than an inside diameter of a second cylindrical portion 15b is disposed between the first cylindrical portion 15a and the second cylindrical portion 15b. An interfitting member-accommodating groove 34 has a groove shape that has a box-shaped cross section, and is formed into an annular shape coaxially near a second end of an outer circumferential surface of a ring member 10A. An interfitting member 35 is produced using a spring steel material into an annular body that has a V-shaped cross section, and in which a bottom portion of the V-shaped cross section is oriented radially outward, and is accommodated in the interfitting member-accommodating groove 34 such that the bottom portion of the V-shaped cross section is made to protrude from the outer circumferential surface of the ring member 10A. An outside diameter of the interfitting member 35 that is accommodated in the interfitting member-accommodating groove 34 is larger than the inside diameter of the second cylindrical portion 15b of the housing case 15B and is smaller than an inside diameter of the fourth cylindrical portion 15d.

Moreover, the rest of the configuration is formed in a similar or identical manner to that of Embodiment 2 above.

In Embodiment 3, the interfitting member 35 is accommodated in the interfitting member-accommodating groove 34 of the ring member 10A. The ring member 10A into which the interfitting member 35 has been mounted is inserted from a side near the opening of the housing case 15B, and a second end portion of the ring member 10A is press-fitted into a second end portion of the second cylindrical portion 15b. At this point, the bottom portion of the V-shaped cross section is pushed down radially inward, and the interfitting member 35 deforms elastically such that an open side widens. Thus, the second end portion of the ring member 10A is elastically supported in the housing case 15B by means of the interfitting member 35.

Consequently, in Embodiment 3, stresses that act on the ring member 10A and the housing case 15B as a result of the interfitting between the ring member 10A and the housing case 15B can also be reduced significantly in a similar or identical manner to Embodiment 2 above.

In this housing case 15B, because the inside diameter of the fourth cylindrical portion 15d that is formed near the first end of the second cylindrical portion 15b is formed so as to be larger than the outside diameter of the interfitting member 35 that is accommodated in the interfitting member-accommodating groove 34, axial length of the second cylindrical portion 15b can be shortened. Thus, during insertion of the ring member 10A, the axial length of the inner circumferential wall surface of the housing case 15B that the interfitting member 35 contacts is shorter, increasing ease of assembly of the ring member 10A into the housing case 15B, and suppressing the occurrence of scraping of the inner circumferential wall surface of the housing case 15B.

Moreover, in Embodiments 2 and 3 above, the interfitting members 33 and 35 are produced using spring steel sheets, but the material of the interfitting member is not limited to a spring steel sheet, provided that it has elasticity, and may be a tolerance ring, or an O ring that is made of a synthetic resin, for example.

Embodiment 4

Figure 9:
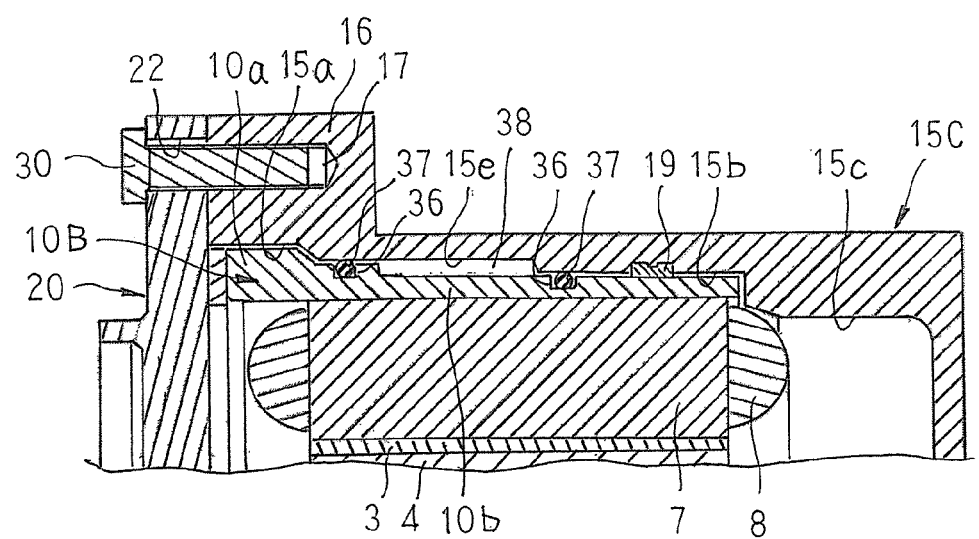
FIG. 9 is a partial cross section that shows a rotary electric machine according to Embodiment 4 of the present invention.

FIG. 9 is a partial cross section that shows a rotary electric machine according to Embodiment 4 of the present invention.

In FIG. 9, in a housing case 15C, a fifth cylindrical portion 15e that has a smaller diameter than an inside diameter of a first cylindrical portion 15a and that has a larger diameter than an inside diameter of a second cylindrical portion 15b is disposed between the first cylindrical portion 15a and the second cylindrical portion 15b. A pair of sealing member-accommodating grooves 36 are recessed into an outer circumferential surface of a ring member 10B in annular shapes so as to be separated axially. The pair of sealing member-accommodating grooves 36 face the second cylindrical portion 15b near the fifth cylindrical surface 15e, and the fifth cylindrical surface 15e near the first cylindrical surface 15a, when the ring member 10B is held in the housing case 15C. Annular packings 37 that functions as sealing members are accommodated inside the pair of sealing member-accommodating grooves 36 to configure a refrigerant flow channel 38 that is constituted by the fifth cylindrical surface 15e and the outer circumferential surface of the ring member 10B. In addition, although not shown, a refrigerant supply port and a refrigerant discharge port are disposed on the housing case 15C so as to be linked to the refrigerant flow channel 38.

Moreover, the rest of the configuration is formed in a similar or identical manner to that of Embodiment 1 above.

According to Embodiment 4, because the refrigerant flow channel 38 is formed on the outer circumference of the ring member 10B, which surrounds the stator 6, heat generated in the stator coil 8, which is a heat-generating part, is transferred to the stator core 7 and the ring member 10B, and is radiated to the refrigerant that flows through the refrigerant flow channel 38. Thus, the stator 6 can be cooled without forming a refrigerant flow channel inside the housing case 15C, enabling the rotary electric machine to be reduced in size.

Moreover, in Embodiment 4 above, the packings 37 are used as the sealing member, but the sealing members are not limited to packing, provided that they can seal in a refrigerant, and may be 0 rings, for example.

What is claimed is:

1. A rotary electric machine comprising:
a stator that includes:
a stator core; and
a stator coil that is mounted onto said stator core;
a ring member that accommodates said stator so as to hold said stator core in an internally fitted state;
a housing case that is formed into a floored cylindrical shape that has an opening at a first end portion, and that accommodates said ring member and said stator;
a cover that is mounted onto said first end portion of said housing case so as to cover said opening of said housing case; and
a rotor that is fixed to a shaft that is rotatably supported by a floor portion of said housing case and by said cover so as to be rotatably disposed on an inner circumferential side of said stator,
wherein:
a first end portion of each of said ring member and said housing case is fixed by fastening to said cover such that a fastening direction of each is oriented in an axial direction and the first end portion of the ring member is fixed to the cover at a position radially inward of a position where the first end portion of the housing case is fixed to the cover; and
a second end portion of said ring member is fitted into and held by said housing case by means of an interfitting member; wherein:
said ring member is produced using a ferrous material;
said housing case is a casting of an aluminum-based material; and
said interfitting member is produced using a ferrous material that is identical to that of said ring member, and is cast into said housing case.

2. The rotary electric machine according to claim 1, wherein:
sealing members are interposed between an inner circumferential wall surface of said housing case and an outer circumferential wall surface of said ring member so as to be separated axially to configure a refrigerant flow channel that is surrounded by said inner circumferential wall surface of said housing case, said outer circumferential wall surface of said ring member, and said sealing members.

3. A rotary electric machine comprising:
a stator that includes:
a stator core; and
a stator coil that is mounted onto said stator core;
a ring member that accommodates said stator so as to hold said stator core in an internally fitted state;
a housing case that is formed into a floored cylindrical shape that has an opening at a first end portion, and that accommodates said ring member and said stator;
a cover that is mounted onto said first end portion of said housing case so as to cover said opening of said housing case; and
a rotor that is fixed to a shaft that is rotatably supported by a floor portion of said housing case and by said cover so as to be rotatably disposed on an inner circumferential side of said stator,
wherein:
a first end portion of each of said ring member and said housing case is fixed by fastening to said cover such that a fastening direction of each is oriented in an axial direction; and
a second end portion of said ring member is fitted into and held by said housing case by means of an interfitting member,
wherein a stress-relieving member that is produced using a metal material that is softer than said ring member is interposed between said cover and said ring member in a fastening portion between said cover and said ring member.

4. A rotary electric machine comprising:
a stator that includes:
a stator core; and
a stator coil that is mounted onto said stator core;
a ring member that accommodates said stator so as to hold said stator core in an internally fitted state;
a housing case that is formed into a floored cylindrical shape that has an opening at a first end portion, and that accommodates said ring member and said stator;
a cover that is mounted onto said first end portion of said housing case so as to cover said opening of said housing case; and
a rotor that is fixed to a shaft that is rotatably supported by a floor portion of said housing case and by said cover so as to be rotatably disposed on an inner circumferential side of said stator,
wherein:
a first end portion of each of said ring member and said housing case is fixed by fastening to said cover such that a fastening direction of each is oriented in an axial direction; and
a second end portion of said ring member is fitted into and held by said housing case by means of an interfitting member,
wherein a stress-relieving member that is produced using a metal material that is softer than a fastening member that fastens said cover and said ring member in a fastening portion between said cover and said ring member is interposed between said fastening member and said cover.

* * * * *